(12) United States Patent
Gong

(10) Patent No.: US 11,861,829 B2
(45) Date of Patent: Jan. 2, 2024

(54) DEEP LEARNING BASED MEDICAL IMAGE DETECTION METHOD AND RELATED DEVICE

(71) Applicant: TENCENT TECHNOLOGY (SHENZHEN) COMPANY LIMITED, Shenzhen (CN)

(72) Inventor: Lijun Gong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 465 days.

(21) Appl. No.: 17/318,495

(22) Filed: May 12, 2021

(65) Prior Publication Data

US 2021/0264599 A1  Aug. 26, 2021

Related U.S. Application Data

(63) Continuation of application No. PCT/CN2020/081655, filed on Mar. 27, 2020.

(30) Foreign Application Priority Data

Apr. 22, 2019 (CN) .......................... 201910324565.8

(51) Int. Cl.
*G06T 7/00* (2017.01)
*G06T 3/40* (2006.01)
(Continued)

(52) U.S. Cl.
CPC .......... *G06T 7/0012* (2013.01); *G06T 3/4053* (2013.01); *G06V 10/25* (2022.01);
(Continued)

(58) Field of Classification Search
CPC .................... G06T 7/0012; G06T 2207/20081
See application file for complete search history.

(56) References Cited

U.S. PATENT DOCUMENTS

2005/0152591 A1* 7/2005 Kiraly .................. G06T 7/0012
  382/154
2016/0086329 A1* 3/2016 Dennerlein .......... A61B 6/5211
  382/132
(Continued)

FOREIGN PATENT DOCUMENTS

CN 108197606 A 6/2018
CN 109190752 A 1/2019
(Continued)

OTHER PUBLICATIONS

International Search Report with English translation and Written Opinion regarding PCT/CN2020/081655 dated Jul. 1, 2020, 9 pages.

*Primary Examiner* — Kevin Ky
(74) *Attorney, Agent, or Firm* — Crowell & Moring LLP

(57) ABSTRACT

The present disclosure provides a deep learning based medical image detection method and apparatus, a computer-readable medium, and an electronic device. The method includes: acquiring a to-be-detected medical image comprising a plurality of slices; for each slice in the to-be-detected medical image: extracting N basic feature maps of the slice by a deep neural network, N being an integer greater than 1, merging features of the N basic feature maps by the deep neural network, to obtain M enhanced feature maps, M being an integer greater than 1, and respectively performing a hierarchically dilated convolutions operation on the M enhanced feature maps by the deep neural network, to generate a superposed feature map of each enhanced feature map; and predicting position information of a region of interest and a confidence score thereof in the to-be-detected medical image by the deep neural network based on the superposed feature map.

20 Claims, 8 Drawing Sheets

(51) Int. Cl.
 *G06V 10/25* (2022.01)
 *G06V 10/80* (2022.01)
 *G06V 10/82* (2022.01)

(52) U.S. Cl.
 CPC ............ *G06V 10/806* (2022.01); *G06V 10/82* (2022.01); *G06T 2207/20081* (2013.01); *G06T 2207/20084* (2013.01)

(56) References Cited

U.S. PATENT DOCUMENTS

| | | | |
|---|---|---|---|
| 2018/0218502 A1* | 8/2018 | Golden | G06T 7/11 |
| 2018/0240235 A1* | 8/2018 | Mazo | G06T 7/11 |
| 2019/0030371 A1* | 1/2019 | Han | A61N 5/1039 |
| 2020/0090328 A1* | 3/2020 | Takei | G06T 7/0012 |
| 2020/0265579 A1* | 8/2020 | Schmidt-Richberg | G16H 50/20 |
| 2021/0264599 A1* | 8/2021 | Gong | G06F 18/253 |

FOREIGN PATENT DOCUMENTS

| | | |
|---|---|---|
| CN | 109544534 A | 3/2019 |
| CN | 110111313 A | 8/2019 |

\* cited by examiner (a) Input a CT image (b) Output a detection result

DEEP LEARNING BASED MEDICAL IMAGE DETECTION METHOD AND RELATED DEVICE

RELATED APPLICATION

This application is a continuation application of PCT Patent Application No. PCT/CN2020/081655, filed on Mar. 27, 2020, which claims priority to Chinese Patent Application No. 201910324565.8 filed with the China National Intellectual Property Administration on Apr. 22, 2019, both of which are incorporated herein by reference in their entireties.

FIELD OF THE TECHNOLOGY

This application relates to the technical field of Artificial Intelligence (AI), and in particular, to a medical image detection technique.

BACKGROUND OF THE DISCLOSURE

At present, a medical image detection model is mainly adopted to perform image detection on data of a two-dimension (2D) image, to recognize a region of interest in the 2D image. This method is generally only suitable for image data such as mammary gland. In a case that a Computed Tomography (CT) image is processed using the method, information of 3D volume data of the CT image would be lost, and the reliability of the medical image detection model is relatively low.

Hence, in the field of medical image detection, how to comprehensively use the 3D volume data of the medical image to improve the reliability of region-of-interest prediction is a technical problem that needs to be resolved urgently.

The present disclosure describes various embodiments, adding one or more of the issues/problems discussed above, improving the reliability of region-of-interest prediction on images.

SUMMARY

Embodiments of this application provide a deep learning based medical image detection method and apparatus, a computer-readable medium, and an electronic device, which can improve the prediction reliability of a region of interest in a medical image to a certain extent.

Other features and advantages of this application become obvious through the following detailed descriptions, or may be partially learned through the practice of this application.

The present disclosure describes a method for performing a deep learning based medical image detection. The method includes acquiring, by a device, a to-be-detected medical image comprising a plurality of slices. The device includes a memory storing instruction and a processor in communication with the memory. The method also includes, for each slice in the to-be-detected medical image: extracting, by the device, N basic feature maps of the slice by a deep neural network, N being an integer greater than 1, merging, by the device, features of the N basic feature maps of the slice by the deep neural network, to obtain M enhanced feature maps of the slice, M being an integer greater than 1, and respectively performing, by the device, a hierarchically dilated convolutions operation on the M enhanced feature maps of the slice by the deep neural network, to generate a superposed feature map of each enhanced feature map of the slice. The method further includes predicting, by the device, position information of a region of interest and a confidence score thereof in the to-be-detected medical image by the deep neural network based on the superposed feature map of each slice in the to-be-detected medical image.

The present disclosure describes an apparatus for performing a deep learning based medical image detection. The apparatus includes a memory storing instructions; and a processor in communication with the memory. When the instructions are executed by the processor, the processor is configured to cause the apparatus to: acquire a to-be-detected medical image comprising a plurality of slices; for each slice in the to-be-detected medical image: extract N basic feature maps of the slice by a deep neural network, N being an integer greater than 1, merge features of the N basic feature maps of the slice by the deep neural network, to obtain M enhanced feature maps of the slice, M being an integer greater than 1, and respectively perform a hierarchically dilated convolutions operation on the M enhanced feature maps of the slice by the deep neural network, to generate a superposed feature map of each enhanced feature map of the slice; and predict position information of a region of interest and a confidence score thereof in the to-be-detected medical image by the deep neural network based on the superposed feature map of each slice in the to-be-detected medical image.

The present disclosure describes a non-transitory computer readable storage medium storing computer readable instructions. The computer readable instructions, when executed by a processor, are configured to cause the processor to perform: acquiring a to-be-detected medical image comprising a plurality of slices; for each slice in the to-be-detected medical image: extracting N basic feature maps of the slice by a deep neural network, N being an integer greater than 1, merging features of the N basic feature maps of the slice by the deep neural network, to obtain M enhanced feature maps of the slice, M being an integer greater than 1, and respectively performing a hierarchically dilated convolutions operation on the M enhanced feature maps of the slice by the deep neural network, to generate a superposed feature map of each enhanced feature map of the slice; and predicting position information of a region of interest and a confidence score thereof in the to-be-detected medical image by the deep neural network based on the superposed feature map of each slice in the to-be-detected medical image.

According to another aspect of the embodiments of this application, provided is a deep learning based medical image detection method, the method including:

acquiring a to-be-detected medical image, the to-be-detected medical image including a plurality of slices;

extracting, for each slice in the to-be-detected medical image, N basic feature maps of the slice by a deep neural network, N being an integer greater than 1;

merging, for each slice in the to-be-detected medical image, features of the N basic feature maps of the slice by the deep neural network, to obtain M enhanced feature maps of the slice, M being an integer greater than 1;

performing, for each slice in the to-be-detected medical image, a hierarchically dilated convolutions operation on the M enhanced feature maps of the slice by the deep neural network, to generate a superposed feature map of each enhanced feature map of the slice; and predicting position information of a region of interest and a confidence score thereof in the to-be-detected medical image by the deep neural network based on the superposed feature map of each slice in the to-be-detected medical image.

According to another aspect of the embodiments of this application, provided is a deep learning based medical image detection apparatus, including:

an image acquisition module, configured to acquire a to-be-detected medical image, the to-be-detected medical image including a plurality of slices;

a feature extraction module, configured to extract, for each slice in the to-be-detected medical image, N basic feature maps of the slice through a deep neural network, N being an integer greater than 1;

a feature merging module, configured to merge, for each slice in the to-be-detected medical image, features of the N basic feature maps of the slice through the deep neural network, to obtain M enhanced feature maps of the slice, M being an integer greater than 1;

a dilated convolution module, configured to respectively perform, for each slice in the to-be-detected medical image, a hierarchically dilated convolutions operation on the M enhanced feature maps of the slice through the deep neural network, to generate a superposed feature map of each enhanced feature map of the slice; and a region-of-interest prediction module, configured to predict position information of a region of interest and a confidence score thereof in the to-be-detected medical image through the deep neural network based on the superposed feature map of each slice in the to-be-detected medical image.

According to another aspect of the embodiments of this application, provided is a computer-readable medium, having a computer program stored thereon, the computer program, when executed by a processor, implementing the deep learning based medical image detection method according to the embodiments above.

According to another aspect of the embodiments of this application, provided is an electronic device, including one or more processors; and a storage apparatus, configured to store one or more programs, the one or more programs, when executed by the one or more processors, causing the one or more processors to implement the deep learning based medical image detection method according to the embodiments above.

According to another aspect of the embodiments of this application, provided is a computer program product, including instructions, the instructions, when run on a computer, causing the computer to execute the deep learning based medical image detection method according to the embodiments above.

In the technical solutions provided by some embodiments of this application, on one hand, by acquiring the to-be-detected medical image including a plurality of adjacent slices and using a deep neural network to process each slice in the to-be-detected medical image, the position information of the region of interest and the confidence score thereof in the to-be-detected medical image can be automatically predicted by using 3D information in the to-be-detected medical image, improving the reliability of a prediction result; on the other hand, basic feature maps at different layers of each slice in the to-be-detected medical image can be merged to obtain enhanced feature maps, that is, low-level features and high-level features in the to-be-detected medical image can be merged; since the low-level features are helpful for detecting small-scale objects in the to-be-detected medical image, in response to the merge of the low-level features and the high-level features, objects of different scales in the to-be-detected medical image can be better detected. In addition, a hierarchically dilated convolutions operation can be performed on the merged enhanced feature maps, so as to capture surrounding information of the region of interest in the to-be-detected medical image, to assist in determining whether it is a true region of interest (for example, a region of a suspected lesion) according to the surrounding information, facilitating more accurate object detection.

In the technical solutions provided by some other embodiments of this application, the deep neural network may adopt an improved Feature Pyramid Network (FPN) network; on one hand, the capability of the network for capturing multi-scale information is strengthened, so as to enhance the detection capability of the network for the regions of interest of different scales; on the other hand, as compared with the related technologies, under the condition of similar detectable accuracy rate of the region of interest, the technical solutions provided by the embodiments of this application only use, at the deep neural network training phase, a slice with annotation information and two slices adjacent thereto in an up-and-down direction, that is, a model with a relatively high detectable rate can be trained using a total of three slices in each medical image, and the 3D information in the medical image may be used, without causing excess redundant information, thereby reducing a data processing amount of the training process and the prediction phase, improving the computing processing rate and efficiency, and facilitating faster detection of the position of the region of interest and the confidence score thereof in the medical image. Moreover, the deep learning based medical image detection method may be applied to multi-scale CT image detection for assisting a doctor in detecting a suspected lesion region in the CT image, thereby reducing workload of a doctor and improving the working efficiency of the doctor.

It is to be understood that, the foregoing general descriptions and the following detailed descriptions are merely for illustration and explanation purposes and are not intended to limit this application.

BRIEF DESCRIPTION OF THE DRAWINGS

Accompanying drawings herein are incorporated into the specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings.

DESCRIPTION OF EMBODIMENTS

Figure 1:
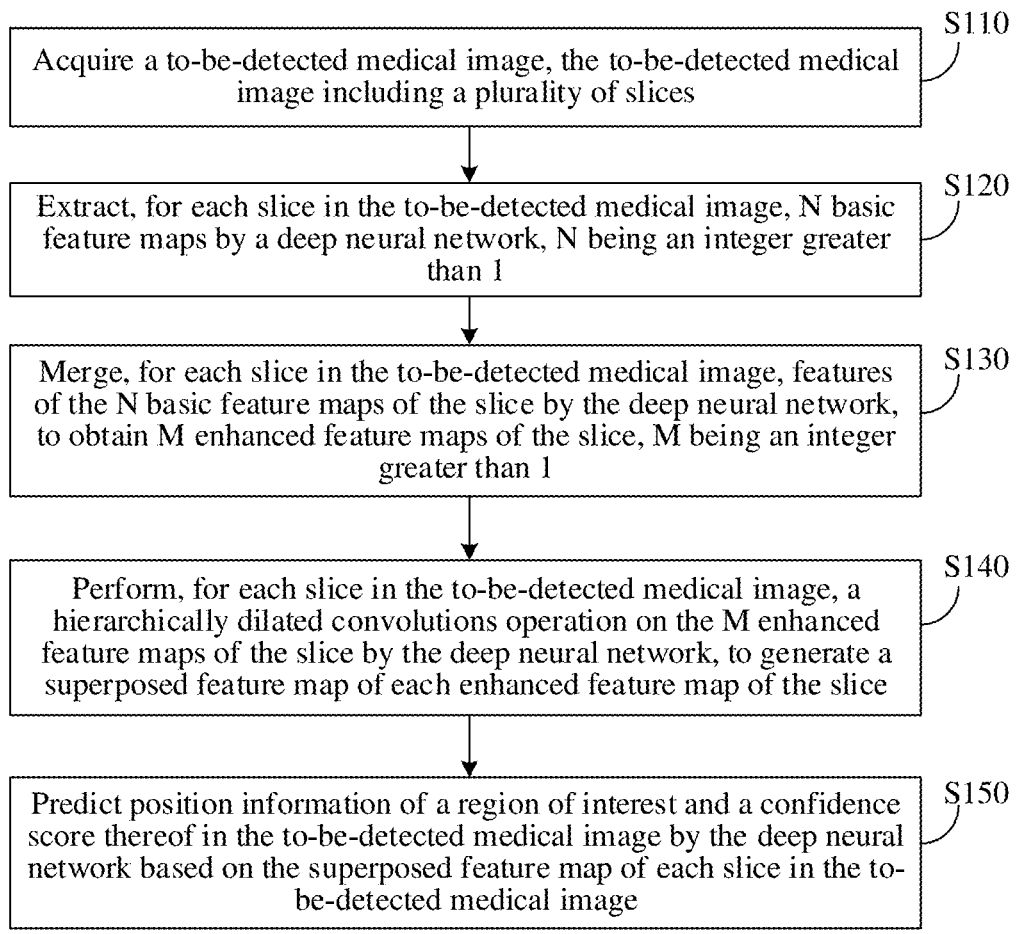
FIG. 1 schematically shows a flowchart of a deep learning based medical image detection method according to an embodiment of this application.

At present, the exemplary implementations are described comprehensively with reference to the accompanying drawings. However, the examples of implementations may be implemented in a plurality of forms, and it is not to be understood as being limited to the examples described herein. Conversely, the implementations are provided to make this application more comprehensive and complete, and comprehensively convey the idea of the examples of the implementations to a person skilled in the art.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technology generally includes image segmentation, image processing, image recognition, image semantic understanding, image retrieval, OCR, video processing, video semantic understanding, video content/behavior recognition, 3D object reconstruction, 3D technology, virtual reality, augmented reality (AR), synchronous positioning, map construction, and other technologies, and further includes common biometric recognition technologies such as face recognition and fingerprint recognition.

Machining Learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

The medical image detection method provided by the embodiments of this application relates to CV technology, ML technology, etc. of AI, and are specifically explained using the following embodiments.

First, abbreviations and key terms involved in the embodiments of this application are defined.

Convolutional neural network (CNN) refers to a neural network in a deep learning classification detection technology, including a convolution layer, a pooling layer, and a fully connected layer.

Region-based Convolutional Neural Networks (RCNN) refer to generating candidate regions on an image, extracting a feature of each candidate region by using a deep network, then transmitting the feature into a classifier of each category, determining whether the feature belongs to this category, and then using a regression machine to finely correct a candidate box position.

Dilated convolution refers to adding a dilated space in a standard convolution operation, a gap existing between convolution kernels so as to enlarge a receptive field of the convolution operation without increasing the number of convolution parameters at the same time.

CT image: CT refers to computed tomography, and an image obtained by scanning a certain part of a human body using X-ray, Y-ray, ultrasonic wave, and the like is referred to as a CT image.

Slice refer to a slice in a CT image, and the CT image is composed of a plurality of continuous slices.

Region-of-interest detection refers to detecting a region of interest in a medical image, such as a target organ region and a suspected lesion region, and providing a confidence score.

Feature map refers to a feature map obtained by convolution of an image and a filter. The feature map may be in convolution with the filter to generate a new feature map.

Anchor refers to rectangular boxes with different sizes and aspect ratios defined on the feature map in advance.

Proposal refers to an anchor obtained after performing categorical regression non-maximum suppression (NMS).

Bounding boxes are abbreviated as BBox.

Ground true bounding boxes (gt_BBoxes) refer to a true region of interest annotated by a doctor, i.e., a true bounding box.

Intersection over Union (IoU) refers to a ratio of an intersection to a union of two bounding boxes.

Region of Interest Pooling (ROI pooling) refers to putting forward a proposal obtained by the network and adjusting to a uniform size during detection.

FPN refers to an article detection method: combining a feature of a shallow network and a feature of a deep network to obtain a new feature map and then further predicting same.

Region Propose Network (RPN) refers to processing an extracted convolution feature map, the RPN being used for searching for a predefined number of regions that possibly include objects.

Confidence score represents a reliability level of a predicted parameter, and the higher the confidence score is, the more reliable the predicted parameter is.

FIG. 1 schematically shows a flowchart of a deep learning based medical image detection method according to an embodiment of this application. The deep learning based medical image detection method provided by the embodiment of this application may be executed by any electronic device having a computing processing capability, such as a terminal device, a server, a server cluster, and a cloud server, which is not limited by this application. In the exemplary explanations, it is described by taking the method according to the embodiment of this application being executed by a cloud server as an example.

As shown in FIG. 1, the deep learning based medical image detection method provided by the embodiment of this application includes the following steps:

Step S110: Acquire a to-be-detected medical image, the to-be-detected medical image including a plurality of slices.

In the embodiment of this application, the to-be-detected medical image may be a CT image including a region of interest (such as a target organ and an target part), and the CT image may include a plurality of continuous slices. In the following image processing process, a plurality of slices of the CT image may be selected, for example, any three adjacent slices (in the following example explanation, the three adjacent slices are respectively referred to as a first slice, a second slice, and a third slice), but this application is not limited thereto; the appropriate number of slices may be selected according to required accuracy and a provided computing amount. For example in one implementation, the selected slices may be slices next to each other as slice No. 1, 2, 3, 4, 5, . . . , and etc. For another example, the selected slices may be every N slices, wherein N is a positive integer. When N=2, the selected slices include slice No. 1, 3, 5, 7, 9, . . . , and etc. When N=3, the selected slices include slice No. 1, 4, 7, 10, 13, . . . , and etc. When N=4, the selected slices include slice No. 1, 5, 9, 13, 17, . . . , and etc.

The technical solution provided by the embodiment of this application can be applied to any 3D medical image. The following embodiments take the CT image as an example for exemplary explanation, and the embodiments do not limit to the CT image.

In the technical solution provided by the embodiment of this application, the deep neural network model generally processes using a single slice as a processing unit, and therefore, in this embodiment, step S120 to step S150 all use a single slice as the processing unit, to introduce the processing process of the deep neural network model.

In actual applications, the deep neural network model may process a plurality of slices included in the to-be-detected medical image one by one for multiple times; the deep neural network model may also concurrently process the plurality of slices included in the to-be-detected medical image in one time; and the processing capability of the deep neural network model is not limited herein.

Step S120: Extract, for each slice in the to-be-detected medical image, N basic feature maps of the slice by a deep neural network. N is an integer greater than or equal to 1.

In the embodiment of this application, the deep neural network may include a feature extraction network. The feature extraction network may extract low-level feature maps and high-level feature maps including different information for the slice as the basic feature maps.

N may be equal to 5, but this application is not limited thereto. The value of N may be determined according to the structure of the feature extraction network.

Step S130: Merge, for each slice in the to-be-detected medical image, features of the N basic feature maps of the slice by the deep neural network, to obtain M enhanced feature maps of the slice. M is an integer greater than or equal to 1.

For example, M may be equal to 3, but this application is not limited thereto. The value of M may be determined according to the value of N and specific requirements.

In an exemplary embodiment, N basic feature maps of the slice may include A low-level feature maps and B high-level feature maps, where both A and B are integers greater than 1; in this case, the merging features of the N basic feature maps of the slice to obtain M enhanced feature maps of the slice may include:

performing convolution processing on an $i^{th}$ low-level feature map of the slice; upsampling a $j^{th}$ high-level feature map of the slice; and adding a feature map obtained by the convolution processing on the $i^{th}$ low-level feature map and a feature map obtained by the upsampling of the $j^{th}$ high-level feature map, to obtain a $k^{th}$ enhanced feature map of the slice, where $1 \leq i < A$, $1 < j \leq B$, $1 < k \leq M$, and i, j, and k are all integers.

In one implementation, adding a feature map obtained by the convolution processing on the $i^{th}$ low-level feature map and a feature map obtained by the upsampling of the $j^{th}$ high-level feature map to obtain a $k^{th}$ enhanced feature map of the slice may include concatenating the feature map obtained by the convolution processing on the $i^{th}$ low-level feature map and the feature map obtained by the upsampling of the $j^{th}$ high-level feature map to obtain the $k^{th}$ enhanced feature map of the slice.

In another implementation, adding a feature map obtained by the convolution processing on the $i^{th}$ low-level feature map and a feature map obtained by the upsampling of the $j^{th}$ high-level feature map to obtain a $k^{th}$ enhanced feature map of the slice may include adding each element in the feature map obtained by the convolution processing on the $i^{th}$ low-level feature map and each corresponding element in the feature map obtained by the upsampling of the $j^{th}$ high-level feature map to obtain corresponding element in the $k^{th}$ enhanced feature map of the slice.

In an exemplary embodiment, the N basic feature maps of the slice may include A low-level feature maps and B high-level feature maps, where both A and B are integers greater than 1; in this case, the merging features of the N basic feature maps of the slice to obtain M enhanced feature maps of the slice may include:

performing convolution processing on an $A^{th}$ low-level feature map of the slice, to obtain a first high-level feature map of the slice as a first enhanced feature map.

In another implementation, the method may include performing convolution processing on an $(A-1)^{th}$ low-level feature map of the slice, upsampling the first high-level feature map of the slice; and adding a feature map obtained by the convolution processing on the $(A-1)^{th}$ low-level feature map and a feature map obtained by the upsampling of the first high-level feature map, to obtain a second high-level feature map of the slice as a second enhanced feature map.

In another implementation, the method may include performing convolution processing on an $(A-2)^n$ low-level feature map of the slice, upsampling the second high-level feature map of the slice; and adding a feature map obtained by the convolution processing on the $(A-2)^{th}$ low-level feature map and a feature map obtained by the upsampling of the second high-level feature map, to obtain a third high-level feature map of the slice as a third enhanced feature map.

In another implementation, when it's needed, the above implementation may be repeat accordingly.

In an exemplary embodiment, A=3, B=3, and M=3. In this case, the merging features of the N basic feature maps of the slice, to obtain M enhanced feature maps of the slice may include:

performing convolution processing on a third low-level feature map of the slice, to obtain a first high-level feature map of the slice as a first enhanced feature map;

performing convolution processing on a second low-level feature map of the slice; upsampling the first high-level feature map of the slice; and adding a feature map obtained by the convolution processing on the second low-level feature map and a feature map obtained by the upsampling of the first high-level feature map, to obtain a second high-level feature map of the slice as a second enhanced feature map; and performing convolution processing on a first low-level feature map of the slice; upsampling the second high-level feature map of the slice; and adding a feature map obtained by the convolution processing on the first low-level feature map and a feature map obtained by the upsampling of the second high-level feature map, to obtain a third high-level feature map of the slice as a third enhanced feature map.

Step S140: Respectively perform, for each slice in the to-be-detected medical image, a hierarchically dilated convolutions operation on the M enhanced feature maps of the slice by the deep neural network, to generate a superposed feature map of each enhanced feature map.

In an exemplary embodiment, the respectively performing a hierarchically dilated convolutions operation on the M enhanced feature maps of the slice, to generate a superposed feature map of each enhanced feature map may include:

processing, for each enhanced feature map in the M enhanced feature maps, the enhanced feature map by K dilated convolution layers, to obtain K dilated feature maps of the enhanced feature map, K being an integer greater than 1;

processing, for each enhanced feature map in the M enhanced feature maps, the enhanced feature map by common convolution layers, to obtain convolution feature maps of the enhanced feature map; and obtaining, for each enhanced feature map in the M enhanced feature maps, the superposed feature map of the enhanced feature map based on the K dilated feature maps and the convolution feature maps of the enhanced feature map.

For example, K may be equal to 3, but this application is not limited thereto. It can be selected according to specific application scenes.

In an exemplary embodiment, the obtaining a superposed feature map of the enhanced feature map based on the K dilated feature maps and the convolution feature maps of the enhanced feature map may include:

concatenating the K dilated feature maps and the convolution feature maps of the enhanced feature map to obtain a concatenated feature map of the enhanced feature map;

obtaining respective weights of the K dilated convolution layers and the common convolution layers based on the concatenated feature map of the enhanced feature map; and obtaining the superposed feature map of the enhanced feature map based on the K dilated feature maps and the convolution feature maps of the enhanced feature map, and the respective weights of the K dilated convolution layers and common convolution layers.

In an exemplary embodiment, receptive fields of the K dilated convolution layers are different.

In an exemplary embodiment, the K dilated convolution layers share convolution kernel parameters (i.e., keeping the parameters consistent), so as to reduce the parameter amount, avoid overfitting to a certain degree, and improve the training speed and prediction speed.

In the embodiment of this application, for other slices in the plurality of adjacent slices, the processing process of obtaining first to third superposed feature maps is similar to that of the first slice, and the process above may be referred to.

Step S150: Predict position information of a region of interest and a confidence score thereof in the to-be-detected medical image by the deep neural network based on the superposed feature map of each slice in the to-be-detected medical image.

In an exemplary embodiment, the predicting position information of a region of interest and a confidence score thereof in the to-be-detected medical image based on the superposed feature map of each slice in the to-be-detected medical image may include:

processing the superposed feature map of each slice in the to-be-detected medical image, to obtain position information of an initial region of interest and an initial confidence score thereof in the to-be-detected medical image; and processing the position information of the initial region of interest and the initial confidence score thereof, to obtain the position information of the region of interest and the confidence score thereof in the to-be-detected medical image.

In an exemplary embodiment, the processing the superposed feature map, to obtain position information of an initial region of interest and an initial confidence score thereof in the to-be-detected medical image may include:

obtaining a dth depth feature map based on a dth superposed feature map of each slice in the to-be-detected medical image, d being an integer greater than or equal to 1 and less than M; and preliminarily classifying M depth feature maps, to obtain the position information of the initial region of interest and the initial confidence score thereof in the to-be-detected medical image.

In the embodiment of this application, the deep neural network may include a feature merging network, a hierarchically dilated convolution network, a preliminary classification network, and a prediction network, the feature merging network may be used for merging the low-level features and high-level features in the slice in the to-be-detected medical image, so as to better detect a large object and a small object in the to-be-detected medical image. The hierarchically dilated convolution network may be used for performing a hierarchically dilated convolutions operation on a feature obtained after merging the low-level feature and high-level feature, to capture the surrounding information of the region of interest of the slice in the to-be-detected medical image so as to facilitate detecting the region of interest more accurately.

In the embodiment of this application, the feature merging network and the hierarchically dilated convolution network may be used as basic networks for the deep neural network, and the high-level network of the deep neural network may adopt an improved FPN network as a detection network. The FPN network may include an RPN network and an RCNN network. The preliminary classification network may be the RPN network, and the prediction network may be the RCNN network, but this application is not limited thereto. Upon the feature extraction by the feature merging network and the hierarchically dilated convolution network, a new feature map can be obtained, and then the new feature map is inputted into the RPN network for preliminarily classifying, that is, the RPN network may be used for performing binary classification (distinguishing whether it is a region of interest) and position regression on the bounding box preset on the new feature map, to obtain position information of an initial region of interest and initial confidence score thereof; then the RPN network inputs the position information of the initial region of interest and the initial confidence score thereof into the RCNN network, for a more accurate category classification and position regression at a second phase, i.e., obtaining a final prediction result, to obtain position information of the final region of interest and the confidence score thereof.

In an exemplary embodiment, the method may further include: acquiring a training dataset, the training dataset including a medical image annotated with the position information of the region of interest and the confidence score thereof; acquiring a slice annotated with the position information of the region of interest and the confidence score thereof in the medical image and two slices adjacent thereto in an up-and-down direction; and training the deep neural network using the slice annotated with the position information of the region of interest and the confidence score thereof in the medical image and the two slices adjacent thereto in the up-and-down direction.

For example, taking the CT image as an example, establishing the training dataset may use a DeepLesion dataset open-sourced by the National Institutes of Health Clinical Center (NIHCC) as the training dataset, but this application is not limited thereto. Using the deep neural network provided by the embodiment of this application may only use one slice annotated with a true region of interest (e.g., a lesion region) and confidence score thereof and two slices adjacent thereto in the up-and-down direction, i.e., only using three slices (generally, the number of slices collected for a certain part of a patient in one time is far greater than 3) in each CT image in the training dataset to train the deep neural network; the trained deep neural network can reach a capability with a relatively high accuracy for detecting large and small regions of interest, so as to lower redundant information and reduce a computing amount and a data processing amount.

For the deep learning based medical image detection method provided by an implementation of this application, on one hand, by acquiring a to-be-detected medical image including a plurality of slices and using a deep neural network to process each slice in the to-be-detected medical image, 3D information in the to-be-detected medical image is used for automatically predicting the position information of the region of interest and the confidence score thereof in the to-be-detected medical image, improving the reliability of the prediction result; on the other hand, the enhanced feature map may be obtained by merging basic feature maps at different layers of each slice in the to-be-detected medical image, that is, the low-level feature and the high-level feature of the slice in the to-be-detected medical image are fused; since the low-level feature is helpful for a small scale feature in the to-be-detected medical image, objects of different scales in the to-be-detected medical image are better detected after merging the low-level feature and the high-level feature. In addition, a hierarchically dilated convolutions operation may be performed on the merged enhanced feature map, so as to capture surrounding information of the region of interest of the slice in the to-be-detected medical image, to assist in determining whether it is a true region of interest according to the surrounding information, facilitating more accurate detection of the region of interest.

In the embodiment of this application, the feature extraction network may use any one or a combination of ResNet, MobileNet, DenseNet, and the like as the basic feature extraction network of the deep neural network. The training of the deep model is relatively easy since the ResNet adopts residual connection and Batch Normalization (BN). Therefore, in the following embodiment below, taking ResNet50 being the feature extraction network as an example for exemplary explanation, this application is actually not limited thereto.

In the embodiment of this application, the schematic diagram of the ResNet50 model is as shown in Table 1 below. A Rectified Linear Unit (ReLU) layer and a BN layer are concatenated behind each convolution layer.

TABLE 1

ResNet50 structure table

| Layer name | Output size | ResNet50 | |
|---|---|---|---|
| Conv1 (a first convolution layer) | 256 × 256 | 7 × 7, 64, stride 2 | |
| Conv2_x (a second convolution layer) | 128 × 128 | 3 × 3 max pool, stride 2<br>1 × 1, 64<br>3 × 3, 64<br>1 × 1, 256 | ×3 blocks |
| Conv3_x (a third convolution layer) | 64 × 64 | 1 × 1, 128<br>3 × 3, 128<br>1 × 1, 512 | ×4 blocks |
| Conv4_x (a fourth convolution layer) | 32 × 32 | 1 × 1, 256<br>3 × 3, 256<br>1 × 1, 1024 | ×6 blocks |
| Conv5_x (a fifth convolution layer) | 16 × 16 | 1 × 1, 512<br>3 × 3, 512<br>1 × 1, 2048 | ×3 blocks |

Figure 2:
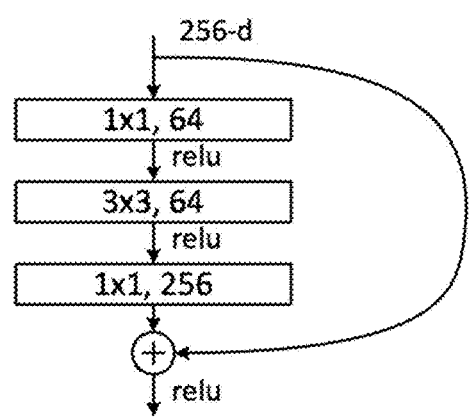
FIG. 2 schematically shows a schematic structural diagram of a block in a Resnet50 network according to an embodiment of this application.

FIG. 2 schematically shows a schematic structural diagram of a block in a Resnet50 network according to an embodiment of this application. The second convolution layer of ResNet50 is taken as an example to explain the structure of the block herein. The block structures of other convolution layers may refer to FIG. 2.

Figure 3:
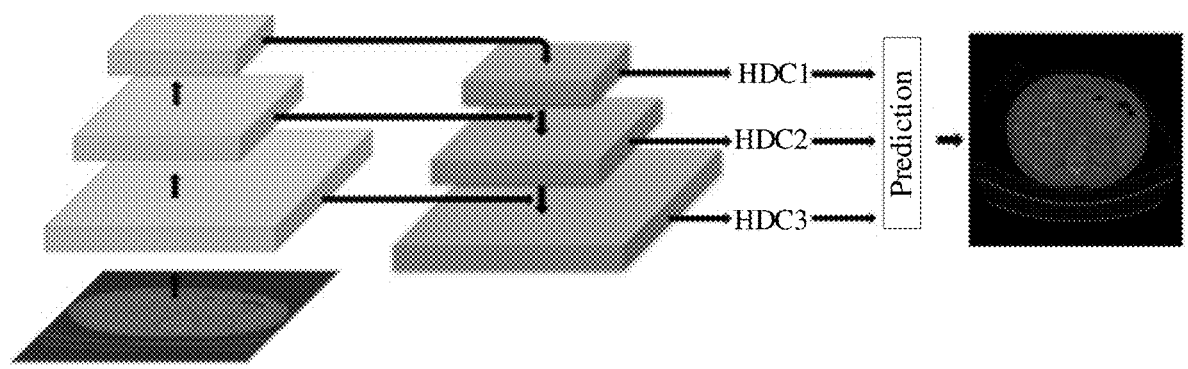
FIG. 3 schematically shows a schematic structural diagram of an improved FPN network according to an embodiment of this application.

FIG. 3 schematically shows a schematic structural diagram of an improved FPN network according to an embodiment of this application. FIG. 3 provides an improved FPN network structure.

As shown in FIG. 3, the embodiment of this application differs from Faster-RCNN in that before preliminarily classifying the RPN network, the FPN network merges the low-level feature and the high-level feature:

(1) bottom-up feature extraction network, for example, the ResNet50 network is used for extracting features; and (2) top-down feature enhanced network, the feature of the current layer extracted by ResNet50 upon 1×1 convolution dimension reduction and the high-level feature upsampled by two times are directly added for feature merging. Since the low-level feature is quite helpful for detecting small objects, the objects can be better detected after merging the low-level feature and the high-level feature. Although low-level feature semantic information is relatively little, the object position is accurate; although high-level feature semantic information is relatively rich, the object position is relatively rough; and the merged feature is adopted for prediction, so as to capture multi-scale object information.

Figure 4:
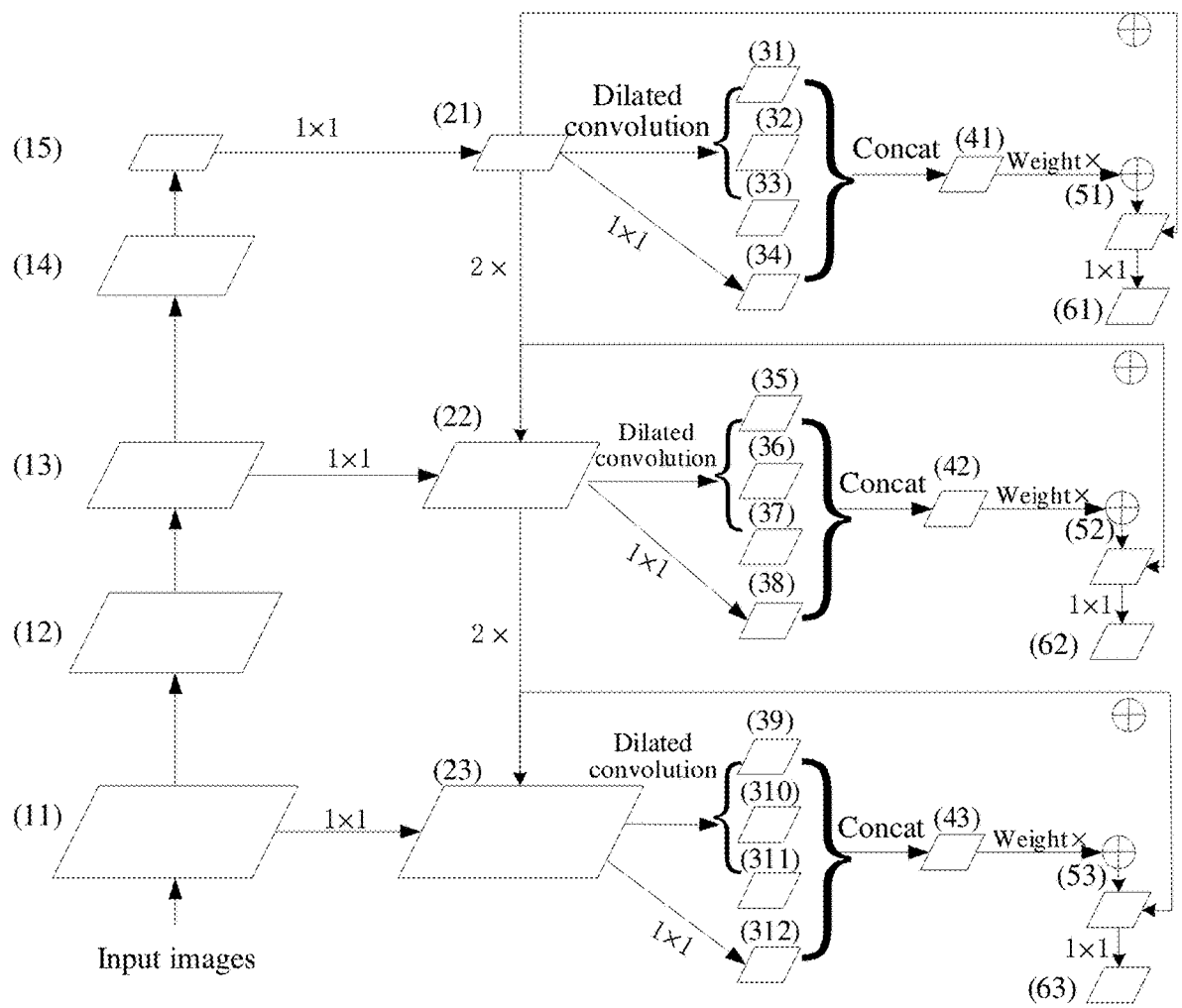
FIG. 4 schematically shows a schematic structural diagram of a feature merging network and a hierarchically dilated convolution network according to an embodiment of this application.

In addition, due to the particularity of the region of interest in the medical image (such as the target organ region and the suspected lesion region), it is required to determine whether it is a region of interest according to the surrounding information, and the embodiment of this application further adds hierarchically dilated convolutions (HDC) operations in the FPN structure (for example, HDC1, HDC2, and HDC3 in FIG. 3, but this application is not limited thereto; and the number of the HDCs depends on specific application scenes) to obtain different sizes of information surrounding the feature map, so as to help more accurate lesion detection; and each HDC structure is as shown, for example, in FIG. 4 below.

FIG. 4 schematically shows a schematic structural diagram of a feature merging network and a hierarchically dilated convolution network according to an embodiment of this application.

As shown in FIG. 4, first to fifth convolution layers of the ResNet50 form a bottom-up route, to generate first to fifth basic feature maps ((11) to (15) in FIG. 4) of each slice of the to-be-detected medical image, and further include a top-down route. A lateral connection exists between the bottom-up route and the top-down route; the main function of lateral connection of 1*1 convolution kernels herein is to reduce the number of convolution kernels, that is, to reduce the number of feature maps, without changing the size of the feature map.

Bottom-up is a forward process of the network. In the forward process, the size of the feature map may change after passing through some layers, but may not change after passing through some other layers. Layers with the size of the feature map unchanged are classified as a stage; therefore, the feature extracted each time is an output of the last layer of each stage, so that a feature pyramid is constituted.

The top-down process is executed using upsampling, while the lateral connection is merging the upsampling result with the feature maps with the same size generated in the bottom-up process. Upon merging, 3*3 convolution kernels may further be adopted to perform convolution on each merging result (not shown in FIG. 4), with the purpose of eliminating an aliasing effect of upsampling. It is assumed here that the generated feature map result is that a first enhanced feature map (21), a second enhanced feature map (22), and a third enhanced feature map (23) respectively have one-to-one correspondence to a fifth basic feature map (15), a third basic feature map (13), and a first basic feature map (11) originally from a bottom-up convolution result.

Still referring to FIG. 4, taking a first slice as an example, the processing modes for other slices are similar to the processing mode of the first slice. Upon passing through a first dilated convolution layer, a second dilated convolution layer, and a third dilated convolution layer of the HDC1, the first enhanced feature map (21) of the first slice separately forms a first dilated feature map (31), a second dilated feature map (32), and a third dilated feature map (33); upon passing through a common convolution layer (for example, 1×1 convolution) of the HDC1, the first enhanced feature map (21) of the first slice further generates a first convolution feature map (34); after concatenating the first to third dilated feature maps of the first slice to the first convolution feature map, a first concatenated feature map (41) is generated to obtain the weights respectively allocated to the first to third dilated convolution layers and the common convolution layer by the HDC1; the corresponding weights are respectively multiplied by the first to third dilated feature maps of the first slice and the first convolution feature map, and then accumulated to obtain a first accumulation feature map (51); for example, assume that respective weights of the first to third dilated convolution layers and the common convolution layer of the HDC1 are respectively a1 to a4, the first accumulation feature map (51)=a1×first dilated feature map (31)+a2×second dilated feature map (32)+a3×third dilated feature map (33)+a4×first convolution feature map (34); then vector addition between the first accumulation feature map (51) and the first enhanced feature map (21) is executed; and further passing through one 1×1 convolution, dimension reduction is executed to obtain a first superposed feature map (61) to reach the purpose of reducing parameters.

Similarly, upon passing through a first dilated convolution layer, a second dilated convolution layer, and a third dilated convolution layer of the HDC2, the second enhanced feature map (22) of the first slice separately forms a fifth dilated feature map (35), a sixth dilated feature map (36), and a seventh dilated feature map (37); upon passing through a common convolution layer (for example, 1×1 convolution) of the HDC2, the second enhanced feature map (22) of the first slice further generates a second convolution feature map (38); after concatenating the fifth dilated feature map (35), the sixth dilated feature map (36), and the seventh dilated feature map (37) of the first slice to the second convolution feature map (38), a second concatenated feature map (42) is generated to obtain the weights respectively allocated to the first to third dilated convolution layers and the common convolution layer by the HDC2; the corresponding weights are respectively multiplied by the fifth dilated feature map (35), the sixth dilated feature map (36), and the seventh dilated feature map (37) of the first slice to the second convolution feature map (38), and then accumulated to obtain a second accumulation feature map (52); for example, assume that respective weights of the first to third dilated convolution layers and the common convolution layer of the HDC2 are respectively b1 to b4, the second accumulation feature map (52)=b1×fifth dilated feature map (35)+b2×sixth dilated feature map (36)+b3×seventh dilated feature map (37)+b4×second convolution feature map (38); then addition between the second accumulation feature map (52) and the second enhanced feature map (22) is executed; further passing through one 1×1 convolution, dimension reduction is executed to obtain a second superposed feature map (62) to reach the purpose of reducing parameters.

Upon passing through a first dilated convolution layer, a second dilated convolution layer, and a third dilated convolution layer of the HDC3, the third enhanced feature map (23) of the first slice separately forms a ninth dilated feature map (39), a tenth dilated feature map (310), and an eleventh dilated feature map (311); upon passing through a common convolution layer (for example, 1×1 convolution) of the HDC3, the third enhanced feature map (23) of the first slice further generates a third convolution feature map (312); after concatenating the ninth dilated feature map (39), the tenth dilated feature map (310), and the eleventh dilated feature map (311) of the first slice to the third convolution feature map (312), a third concatenated feature map (43) is generated to obtain the weights respectively allocated to the first to third dilated convolution layers and the common convolution layer by the HDC3; the corresponding weights are respectively multiplied by the ninth dilated feature map (39), the tenth dilated feature map (310), and the eleventh dilated feature map (311) of the first slice and the third convolution feature map (312), and then accumulated to obtain a third accumulation feature map (53); for example, assume that respective weights of the first to third dilated convolution layers and the common convolution layer of the HDC3 are respectively c1 to c4, the third accumulation feature map (53)=c1× ninth dilated feature map (39)+c2×tenth dilated feature map (310)+c3×eleventh dilated feature map (311)+c4×third convolution feature map (312); then addition between the third accumulation feature map (53) and the third enhanced feature map (23) is executed; further passing through one 1×1 convolution, dimension reduction is executed to obtain a third superposed feature map (63) to reach the purpose of reducing parameters.

Figure 5:
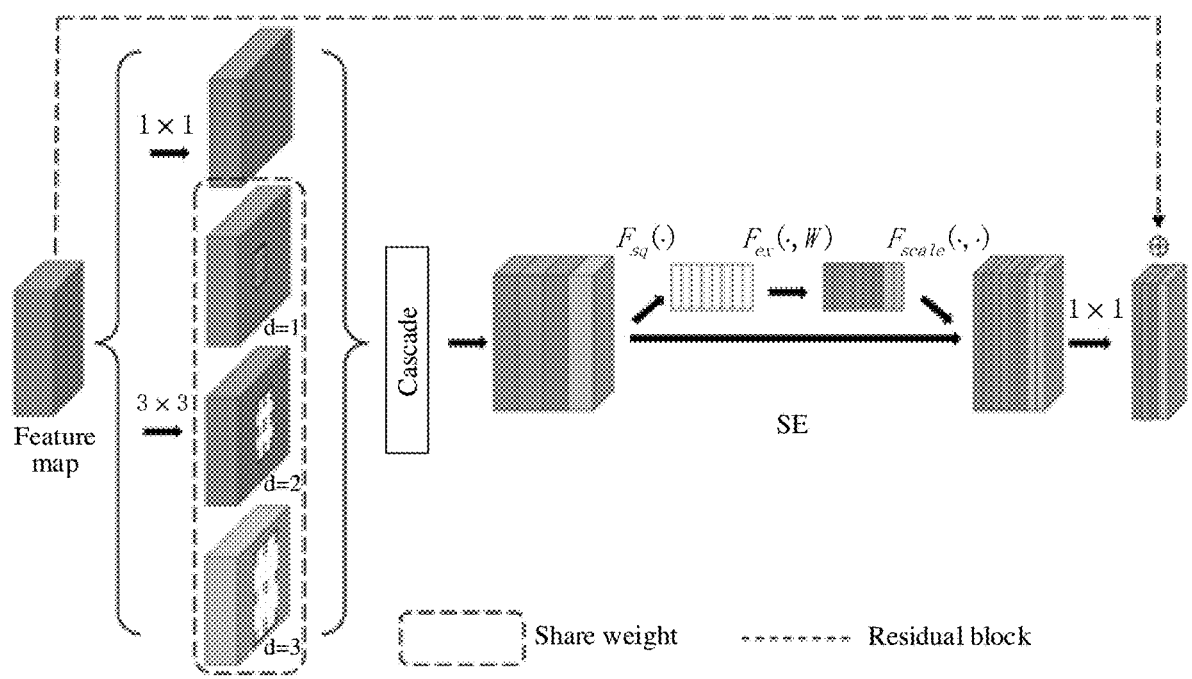
FIG. 5 schematically shows a schematic structural diagram of a hierarchically dilated convolution network according to an embodiment of this application.

FIG. 5 schematically shows a schematic structural diagram of a hierarchically dilated convolution network according to an embodiment of this application. The share weight in FIG. 5 represents that the first to third dilated convolution layers share convolution kernel parameters.

FIG. 5 provides an example of a hierarchically dilated convolution structure. In the embodiment of this application, it is assumed that the hierarchically dilated convolution structures at the first stage to the third stage are the same, and therefore, only one of them is used as an example herein. After merging the low-level feature and the high-level feature, a depth feature map is obtained, for example, assume that it is a first enhanced feature map (21) of the first slice, the processing of other enhanced feature maps is similar to that of the first enhanced feature map (21). The first enhanced feature map (21) passes through one 1×1 common convolution layer and dilated convolution layers with three 3×3 sizes (i.e., the first to third dilated convolution layers). Dilated convolution enlarges the receptive fields by dilating the convolution kernel, and the receptive fields are grown exponentially. Dilated convolution does not increase the parameter amount; a weight value given by an excess point is 0, and no training is needed.

The receptive fields of different dilated convolution layers here are different, so as to capture information of different scales of the slice in the CT image. Then four results (for example, the first dilated feature map (31), the second dilated feature map (32), the third dilated feature map (33), and the first convolution feature map (34)) are concatenated to obtain a new concatenated feature map (for example, a first concatenated feature map (41)); this new concatenated feature map includes surrounding information of three different receptive fields.

The so-called dilated convolution indicates injecting dilation into the convolution kernel (i.e., 0); and the number of the injected dilations is decided by parameter dilation (abbreviated as d in the drawings). For example, d=1, the receptive field of the convolution kernel is 3×3; d=2, the receptive field of the convolution kernel is 7×7; and d=3, the receptive field of the convolution kernel is 11×11.

Different receptive fields have different important degrees to the detection of the regions of interest, and the receptive field required by a small object is different from that of a large object. Hence, a Squeeze and Excitation module (SE module) is used for automatically learning a corresponding weight. The importance of different receptive fields to different objects may be learnt through the SE module. Finally, dimension reduction is executed by one 1×1 convolution to achieve the purpose of lowering the parameter.

Upon the operations above, vector addition is performed on a first superposed feature map of the first slice, a first superposed feature map of the second slice, and a first superposed feature map of the third slice to obtain a new first depth feature map; vector addition is performed on a second superposed feature map of the first slice, a second superposed feature map of the second slice, and a second superposed feature map of the third slice to obtain a new second depth feature map; vector addition is performed on a third superposed feature map of the first slice, a third superposed feature map of the second slice, and a third superposed feature map of the third slice to obtain a new third depth feature map; and then the three new first to third depth feature maps are inputted into the RPN network for preliminarily classifying, and then enter the RCNN network for final prediction, to obtain final lesion position information and confidence score.

For the method provided by the embodiment of this application, regarding the to-be-detected medical image similar to a CT image, its specific 3D information may be used for inputting a plurality of adjacent slices into a deep neural network for detecting a region of interest; upon ROI-pooling, information of the plurality of slices is merged to obtain a new feature map, so as to further predict the position information of the region of interest, i.e., using the 3D information of the CT image to improve the reliability of the prediction result. Applying computed tomography to a human part may obtain a 3D imaging picture. In addition, during the training and prediction phases of the model, only three slices of one CT image may be inputted, which does not increase the computing amount or introduce access redundant information. Moreover, the method above further considers the multi-scale problem existing in the CT image lesion detection, i.e., scales for different regions of interest are greatly different from each other, from 1 mm to 500 mm, and the like. It is obvious that for the CT image for the simultaneous detection of the large object and small object, the deep neural network provided by the embodiment of this application has a more sensitive information extraction capability.

In the embodiment of this application, the deep neural network is trained using the training dataset in advance. During parameter initialization, the first to fifth convolution layers of the ResNet50 may adopt the parameter of the ResNet50 trained in advance on an ImageNet dataset, and the newly added layer may adopt a Gaussian distribution with a variance of 0.01 and a mean of 0 for initialization.

In the embodiment of this application, during training the model, in the RPN network, the IoU value of anchor and gt_BBoxes of greater than 0.5 is used as a positive sample, and the IoU value of less than 0.3 is used as a negative sample; and the number is 48. For the RCNN network, the IoU value of proposal and gt_BBoxes of greater than 0.5 is used as a positive sample, and the IoU value of less than 0.4 is used as a negative sample; and the sampling number is 48.

In the embodiment of this application, a loss function may be divided into two parts; a first part is, for a sorting loss of an article in each bounding box, a cross entropy loss function is adopted; the other part is, for a regression loss of each bounding box position, a smooth L1 loss function is adopted.

In the embodiment of this application, stochastic gradient descent (SGD) based gradient descent method may be adopted to solve a convolutional template parameter w and an offset parameter b of the neural network model; in each iteration process, a prediction result error is calculated and backpropagated to a convolutional neural network model; and gradient is calculated and the parameter of the convolutional neural network model is updated.

Figure 6:
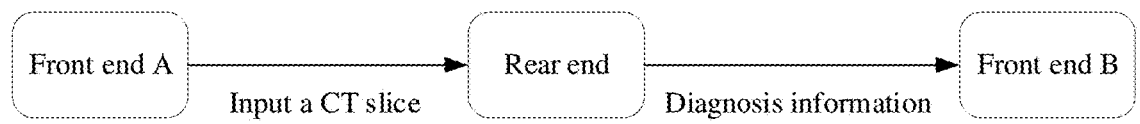
FIG. 6 schematically shows a schematic diagram of a deep learning based medical image detection method according to an embodiment of this application.

FIG. 6 schematically shows a schematic diagram of a deep learning based medical image detection method according to an embodiment of this application.

FIG. 6 shows the use flowchart of the method provided by the embodiment of this application; when a front end A (which may be, for example, a medical image acquisition device) acquires image data, such as a CT image, a plurality of CT slices of the CT image may be uploaded to a rear end; the rear end uses the deep learning based medical image detection method provided by the embodiment above, to obtain a region of a suspected lesion and a corresponding confidence score as diagnosis information to be outputted to a front end B (for example, a doctor client).

Figure 7:
FIG. 7 schematically shows a schematic diagram of a detection result of a deep learning based medical image detection method provided by an embodiment of this application.
Figure 7:
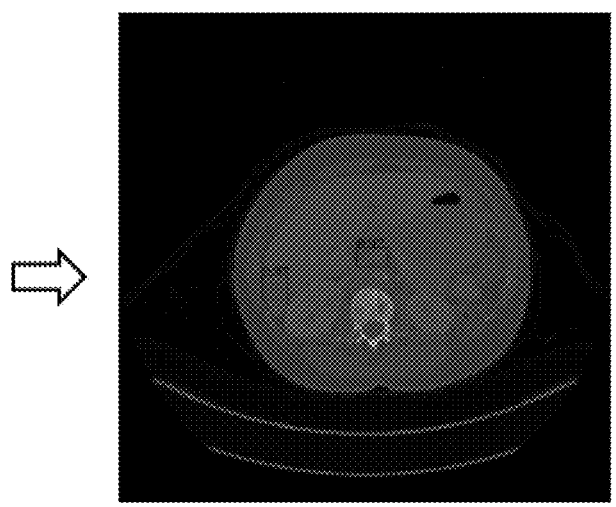

FIG. 7 schematically shows a schematic diagram of a detection effect of a deep learning based medical image detection method provided by an embodiment of this application.

As shown in FIG. 7, the CT image shown in (a) is inputted into the deep neural network in the embodiment of this application, so that a detection result as shown in FIG. (b) can be outputted.

In the deep learning based medical image detection method provided by the implementation of this application, the deep neural network may adopt an improved Feature Pyramid Network (FPN) network; on one hand, the capability of the network for capturing multi-scale information is strengthened, so as to enhance the detection capability of the network for the regions of interest of different scales; on the other hand, as compared with the related technologies, under the condition of similar detectable accuracy rate of the region of interest, the technical solution provided by the embodiment of this application only uses, during the deep neural network training phase, a slice with annotation information and two slices adjacent thereto in the up-and-down direction, that is, a model with a relatively high detectable rate can be trained using a total of three slices in each medical image, and the 3D information in the medical image can be used, without bringing excess redundant information, so as to reduce a data processing amount of the training process and the prediction phase, improve the computing processing rate and efficiency, and facilitate faster detection of the position of the region of interest and the confidence score thereof in the medical image. Moreover, the deep learning based medical image detection method may be applied to multi-scale CT image detection for assisting a doctor in detecting a suspected lesion region in the CT image; it can be arranged to hospitals in different sizes, community rehabilitation centers, and the like, assisting a doctor in shortening diagnosis time, reducing workload of the doctor, and improving the working efficiency of the doctor.

Other contents and specific implementations in the embodiment of this application may refer to the embodiment above, and will not be repeated herein.

Figure 8:
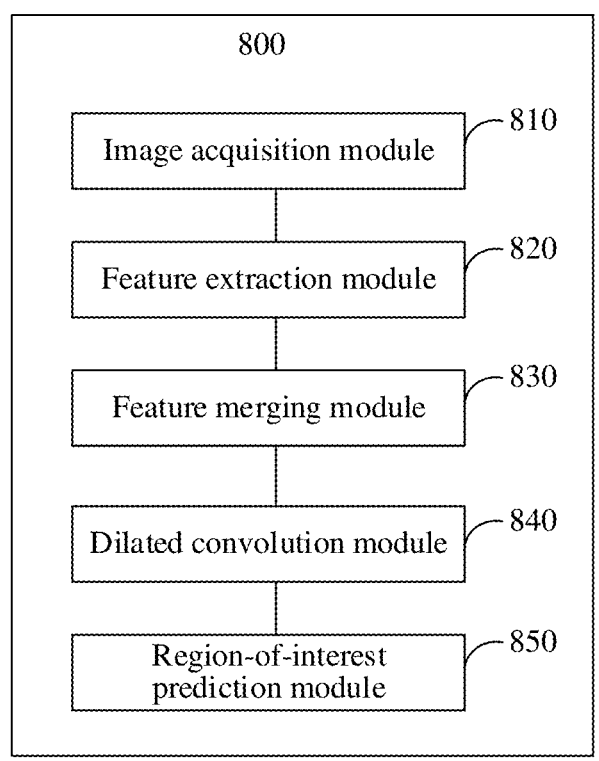
FIG. 8 schematically shows a block diagram of a deep learning based medical image detection apparatus according to an embodiment of this application.

FIG. 8 schematically shows a block diagram of a deep learning based medical image detection apparatus according to an embodiment of this application. The deep learning based medical image detection apparatus provided by the embodiment of this application may be disposed in any electronic device having a computing processing capability, such as a terminal device, a server, a server cluster, and a cloud server, which is not limited by this application; and in the exemplary explanations, it is described by taking the apparatus according to the embodiment of this application being disposed in a cloud server as an example for execution.

As shown in FIG. 8, the deep learning based medical image detection apparatus 800 provided by the embodiment of this application may include an image acquisition module 810, a feature extraction module 820, a feature merging module 830, a dilated convolution module 840, and a region-of-interest prediction module 850.

The image acquisition module 810 is configured to acquire a to-be-detected medical image, the to-be-detected medical image including a plurality of slices.

The feature extraction module 820 is configured to extract, for each slice in the to-be-detected medical image, N basic feature maps of the slice through a deep neural network, N being an integer greater than 1.

The feature merging module 830 is configured to perform, for each slice in the to-be-detected medical image, feature merge on the N basic feature maps of the slice through the deep neural network, to obtain M enhanced feature maps of the slice, M being an integer greater than 1.

The dilated convolution module 840 is configured to respectively perform, for each slice in the to-be-detected medical image, a hierarchically dilated convolutions operation on the M enhanced feature maps of the slice through the deep neural network, to generate a superposed feature map of each enhanced feature map of the slice.

The region-of-interest prediction module 850 is configured to predict position information of a region of interest and a confidence score thereof in the to-be-detected medical image through the deep neural network based on the superposed feature map of each slice in the to-be-detected medical image.

In the exemplary embodiment, the N basic feature maps include A low-level feature maps and B high-level feature maps, both A and B being integers greater than 1. The feature merging module 830 is configured to:

perform convolution processing on an $i^{th}$ low-level feature map of the slice; upsample a $j^{th}$ high-level feature map of the slice; and add a feature map obtained by the convolution processing on the $i^{th}$ low-level feature map and a feature map obtained by the upsampling of the $j^{th}$ high-level feature map, to obtain a $k^{th}$ enhanced feature map of the slice, where $1 \le i < A$, $1 < j \le B$, $1 < k \le M$, and i, j, and k are all integers.

In the exemplary embodiment, the N basic feature maps include A low-level feature maps and B high-level feature maps, both A and B being integers greater than 1; and the feature merging module 830 is configured to:

perform convolution processing on an $A^{th}$ low-level feature map of the slice, to obtain a first high-level feature map of the slice as a first enhanced feature map.

In the exemplary embodiment, A=3, B=3, and M=3. The feature merging module 830 is configured to:

perform convolution processing on a third low-level feature map of the slice, to obtain a first high-level feature map of the slice as a first enhanced feature map;

perform convolution processing on a second low-level feature map of the slice; upsample the first high-level feature map of the slice; and add a feature map obtained by the convolution processing on the second low-level feature map and a feature map obtained by the upsampling of the first high-level feature map, to obtain a second high-level feature map of the slice as a second enhanced feature map; and perform convolution processing on a first low-level feature map of the slice; upsample the second high-level feature map of the slice; and add a feature map obtained by the convolution processing on the first low-level feature map and a feature map obtained by the upsampling of the second high-level feature map, to obtain a third high-level feature map of the slice as a third enhanced feature map.

In the exemplary embodiment, the dilated convolution module 840 may include:

a dilated feature obtaining unit, configured to respectively process, for each enhanced feature map in the M enhanced feature maps, the enhanced feature map through K dilated convolution layers, to obtain K dilated feature maps of the enhanced feature map, K being an integer greater than 1;

a convolution feature obtaining unit, configured to process, for each enhanced feature map in the M enhanced feature maps, the enhanced feature map through common convolution layers, to obtain convolution feature maps of the enhanced feature map; and a superposed feature obtaining unit, configured to obtain, for each enhanced feature map in the M enhanced feature maps, the superposed feature map of the enhanced feature map based on the K dilated feature maps and the convolution feature maps of the enhanced feature map.

In the exemplary embodiment, the superposed feature obtaining unit is configured to:

concatenate the K dilated feature maps and the convolution feature maps of the enhanced feature map to obtain a concatenated feature map of the enhanced feature map;

obtain respective weights of the K dilated convolution layers and the common convolution layers based on the concatenated feature map of the enhanced feature map; and obtain the superposed feature map of the enhanced feature map based on the enhanced feature map, the K dilated feature maps and convolution feature maps, and the respective weights of the K dilated convolution layers and common convolution layers.

In the exemplary embodiment, receptive fields of the K dilated convolution layers are different.

In the exemplary embodiment, the K dilated convolution layers share convolution kernel parameters.

In the exemplary embodiment, the region-of-interest prediction module 840 may include a preliminary classification unit and a region-of-interest predicting unit.

The preliminary classification unit is configured to process the superposed feature map of each slice in the to-be-detected medical image, to obtain position information of an initial region of interest and an initial confidence score thereof in the to-be-detected medical image; and the region-of-interest predicting unit is configured to process the position information of the initial region of interest and the initial confidence score thereof, to obtain the position information of the region of interest and the confidence score thereof in the to-be-detected medical image.

In the exemplary embodiment, the preliminary classification unit is configured to:

obtain a $d^{th}$ depth feature map based on a $d^{th}$ superposed feature map of each slice in the to-be-detected medical image, d being an integer greater than or equal to 1 and less than M; and preliminarily classify M depth feature maps, to obtain the position information of the initial region of interest and the initial confidence score thereof in the to-be-detected medical image.

In the exemplary embodiment, the deep learning based medical image detection apparatus 800 may further include:

a training set acquisition module, configured to acquire a training dataset, the training dataset including a medical image annotated with the position information of the region of interest and the confidence score thereof;

a slice acquisition module, configured to acquire a slice annotated with the position information of the region of interest and the confidence score thereof in the medical image and two slices adjacent thereto in an up-and-down direction; and a model training module, configured to train the deep neural network using the slice annotated with the position information of the region of interest and the confidence score thereof in the medical image and the two slices adjacent thereto in the up-and-down direction.

In the exemplary embodiment, the to-be-detected medical image may include a CT image.

Since each functional module of the deep learning based medical image detection apparatus 800 of the exemplary embodiment of this application corresponds to each step of the exemplary embodiment of the deep learning based medical image detection method above, and the details are not repeated here.

In the exemplary embodiment of this application, also provided is an electronic device capable of implementing the method above.

Figure 9:
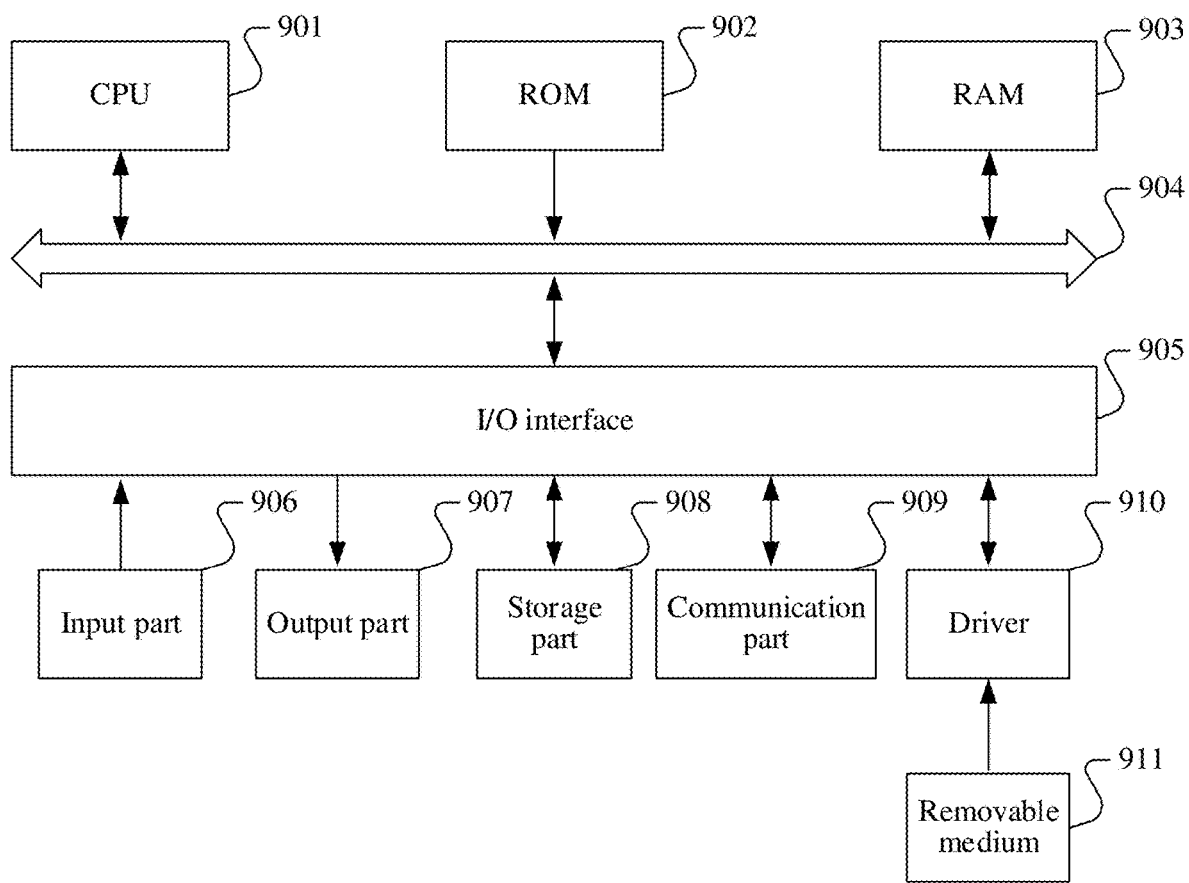
FIG. 9 shows a schematic structural diagram of a computer system adapted to implement an electronic device according to an embodiment of this application.

FIG. 9 shows a schematic structural diagram of a computer system adapted to implement an electronic device according to an embodiment of this application. The computer system of the electronic device shown in FIG. 9 is merely an example, and does not constitute any limitation on functions and use ranges of the embodiments of this application.

As shown in FIG. 9, the computer system includes a central processing unit (CPU) 901, which can perform various appropriate actions and processing according to a program stored in a read-only memory (ROM) 902 or a program loaded into a random access memory (RAM) 903 from a storage part 908. The RAM 903 further stores various programs and data required for system operations. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, or the like; an output part 907 including a cathode ray tube (CRT), a liquid crystal display (LCD), a speaker, or the like; a storage part 908 including a hard disk or the like; and a communication part 909 of a network interface card, including a LAN card, a modem, or the like. The communication part 909 performs communication processing by using a network such as the Internet. A driver 910 is also connected to the I/O interface 905 as required. A removable medium 911, such as a magnetic disk, an optical disc, a magneto-optical disk, or a semiconductor memory, is installed on the drive 910 as required, so that a computer program read from the removable medium is installed into the storage part 908 as required.

Particularly, according to an embodiment of this application, the processes described in the following by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from a network through the communication part 1009, and/or installed from the removable medium 1011. When the computer program is executed by the central processing unit (CPU) 901, the above functions defined in the system of this application are performed.

The computer-readable medium shown in this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The computer-readable medium may send, propagate, or transmit a program that is used by or used in conjunction with an instruction system, an apparatus, or a device. The program code included in the computer-readable medium may be transmitted by using any suitable medium, including but not limited to, wireless transmission, a wire, a cable, radio frequency (RF) or the like, or any other suitable combination thereof.

The flowcharts and block diagrams in the accompanying drawings illustrate possible system architectures, functions and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related modules or units described in the embodiments of this application may be implemented in a software manner, or may be implemented in a hardware manner, and the module or the unit described can also be set in a processor. Names of these modules or units do not constitute a limitation on the modules or the units in a case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the deep learning based medical image detection method according to the embodiments above.

For example, the electronic device may implement the following as shown in FIG. 1: step S110: acquiring a to-be-detected medical image, the to-be-detected medical image including a plurality of slices; step S120: extracting, for each slice in the to-be-detected medical image, N basic feature maps of the slice by a deep neural network, N being an integer greater than 1; step S130: merging, for each slice in the to-be-detected medical image, features of the N basic feature maps of the slice by the deep neural network, to obtain M enhanced feature maps of the slice, M being an integer greater than 1; step S140: respectively performing, for each slice in the to-be-detected medical image, a hierarchically dilated convolutions operation on each enhanced feature map by the deep neural network, to generate a superposed feature map of each enhanced feature map of the slice; and step S150: predicting position information of a region of interest and a confidence score thereof in the to-be-detected medical image by the deep neural network based on the superposed feature map of each slice in the to-be-detected medical image.

Although several modules or units of a device or an apparatus for action execution are mentioned in the foregoing detailed descriptions, the division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this application may be implemented in a form of a software product. The software product may be stored in a non-volatile storage medium (which may be a CD-ROM, a USB flash drive, a removable hard disk, or the like) or on a network, and includes several instructions for instructing a computing device (which may be a personal computer, a server, a touch terminal, network device, or the like) to perform the methods according to the implementations of this application.

Other embodiments of this application are apparent to a person skilled in the art from consideration of the specification and practice of this application here. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. A method for performing a deep learning based medical image detection, the method comprising:
  acquiring, by a device comprising a memory storing instruction and a processor in communication with the memory, a to-be-detected medical image comprising a plurality of slices;
  for each slice in the to-be-detected medical image:
    extracting, by the device, N basic feature maps of the slice by a deep neural network, N being an integer greater than 1,
    merging, by the device, features of the N basic feature maps of the slice by the deep neural network, to obtain M enhanced feature maps of the slice, M being an integer greater than 1, and
    respectively performing, by the device, a hierarchically dilated convolutions operation on the M enhanced feature maps of the slice by the deep neural network, to generate a superposed feature map of each enhanced feature map of the slice; and
  predicting, by the device, position information of a region of interest and a confidence score thereof in the to-be-detected medical image by the deep neural network based on the superposed feature map of each slice in the to-be-detected medical image.

2. The method according to claim 1, wherein:
the N basic feature maps comprise A low-level feature maps and B high-level feature maps, both A and B being integers greater than 1; and
the merging the features of the N basic feature maps of the slice by the deep neural network, to obtain the M enhanced feature maps of the slice comprises:
  performing, by the device, convolution processing on an $i^{th}$ low-level feature map of the slice,
  upsampling, by the device, a $j^{th}$ high-level feature map of the slice, and
  adding, by the device, a feature map obtained by the convolution processing on the $i^{th}$ low-level feature map and a feature map obtained by the upsampling of the $j^{th}$ high-level feature map, to obtain a $k^{th}$ enhanced feature map of the slice,
  wherein $1 \leq i < A$, $1 < j \leq B$, $1 < k \leq M$, and i, j, and k are all integers.

3. The method according to claim 1, wherein:
the N basic feature maps comprise A low-level feature maps and B high-level feature maps, both A and B being integers greater than 1; and
the merging features of the N basic feature maps of the slice by the deep neural network, to obtain M enhanced feature maps of the slice comprises:
  performing, by the device, convolution processing on an $A^{th}$ low-level feature map of the slice, to obtain a first high-level feature map of the slice as a first enhanced feature map.

4. The method according to claim 1, wherein:
the N basic feature maps comprise A low-level feature maps and B high-level feature maps;
$A=3$, $B=3$, and $M=3$; and
the merging the features of the N basic feature maps of the slice by the deep neural network, to obtain the M enhanced feature maps of the slice comprises:
  performing, by the device, convolution processing on a third low-level feature map of the slice, to obtain a first high-level feature map of the slice as a first enhanced feature map,
  performing, by the device, convolution processing on a second low-level feature map of the slice; upsampling the first high-level feature map of the slice; and adding a feature map obtained by the convolution processing on the second low-level feature map and a feature map obtained by the upsampling of the first high-level feature map, to obtain a second high-level feature map of the slice as a second enhanced feature map, and performing, by the device, convolution processing on a first low-level feature map of the slice; upsampling the second high-level feature map of the slice; and adding a feature map obtained by performing the convolution processing on the first low-level feature map and a feature map obtained by the upsampling of the second high-level feature map, to obtain a third high-level feature map of the slice as a third enhanced feature map.

5. The method according to claim 1, wherein the respectively performing the hierarchically dilated convolutions operation on the M enhanced feature maps of the slice by the deep neural network, to generate the superposed feature map of each enhanced feature map comprises:

for each enhanced feature map in the M enhanced feature maps:
respectively processing, by the device, the enhanced feature map by using K dilated convolution layers, to obtain K dilated feature maps of the enhanced feature map, K being an integer greater than 1;
processing, by the device, the enhanced feature map by a common convolution layer, to obtain convolution feature maps of the enhanced feature map; and
obtaining, by the device, the superposed feature map of the enhanced feature map based on the K dilated feature maps and the convolution feature maps of the enhanced feature map.

6. The method according to claim 5, wherein the obtaining the superposed feature map of the enhanced feature map based on the K dilated feature maps and the convolution feature maps of the enhanced feature map comprises:

concatenating, by the device, the K dilated feature maps and the convolution feature maps of the enhanced feature map to obtain a concatenated feature map of the enhanced feature map;
obtaining, by the device, respective weights of the K dilated convolution layers and the common convolution layers based on the concatenated feature map of the enhanced feature map; and
obtaining, by the device, the superposed feature map of the enhanced feature map based on the enhanced feature map, the K dilated feature maps and the convolution feature maps, and the respective weights of the K dilated convolution layers and the common convolution layers.

7. The method according to claim 1, wherein the predicting the position information of the region of interest and the confidence score thereof in the to-be-detected medical image by the deep neural network based on the superposed feature map of each slice in the to-be-detected medical image comprises:

processing, by the device, the superposed feature map of each slice in the to-be-detected medical image, to obtain the position information of an initial region of interest and an initial confidence score thereof in the to-be-detected medical image; and
processing, by the device, the position information of the initial region of interest and the initial confidence score thereof, to obtain the position information of the region of interest and the confidence score thereof in the to-be-detected medical image.

8. An apparatus for performing a deep learning based medical image detection, the apparatus comprising:
a memory storing instructions; and
a processor in communication with the memory, wherein, when the instructions are executed by the processor, the processor is configured to cause the apparatus to:

acquire a to-be-detected medical image comprising a plurality of slices;
for each slice in the to-be-detected medical image:
extract N basic feature maps of the slice by a deep neural network, N being an integer greater than 1,
merge features of the N basic feature maps of the slice by the deep neural network, to obtain M enhanced feature maps of the slice, M being an integer greater than 1, and
respectively perform a hierarchically dilated convolutions operation on the M enhanced feature maps of the slice by the deep neural network, to generate a superposed feature map of each enhanced feature map of the slice; and
predict position information of a region of interest and a confidence score thereof in the to-be-detected medical image by the deep neural network based on the superposed feature map of each slice in the to-be-detected medical image.

9. The apparatus according to claim 8, wherein:
the N basic feature maps comprise A low-level feature maps and B high-level feature maps, both A and B being integers greater than 1; and
when the processor is configured to cause the apparatus to merge the features of the N basic feature maps of the slice by the deep neural network, to obtain the M enhanced feature maps of the slice, the processor is configured to cause the apparatus to:
perform convolution processing on an $i^{th}$ low-level feature map of the slice,
upsample a $j^{th}$ high-level feature map of the slice, and
add a feature map obtained by the convolution processing on the $i^{th}$ low-level feature map and a feature map obtained by the upsampling of the $j^{th}$ high-level feature map, to obtain a $k^{th}$ enhanced feature map of the slice,
wherein $1 \leq i < A$, $1 < j \leq B$, $1 < k \leq M$, and i, j, and k are all integers.

10. The apparatus according to claim 8, wherein:
the N basic feature maps comprise A low-level feature maps and B high-level feature maps, both A and B being integers greater than 1; and
when the processor is configured to cause the apparatus to merge features of the N basic feature maps of the slice by the deep neural network, to obtain M enhanced feature maps of the slice, the processor is configured to cause the apparatus to:
perform convolution processing on an $A^{th}$ low-level feature map of the slice, to obtain a first high-level feature map of the slice as a first enhanced feature map.

11. The apparatus according to claim 8, wherein:
the N basic feature maps comprise A low-level feature maps and B high-level feature maps;
A=3, B=3, and M=3; and
when the processor is configured to cause the apparatus to merge the features of the N basic feature maps of the slice by the deep neural network, to obtain the M enhanced feature maps of the slice, the processor is configured to cause the apparatus to:
perform convolution processing on a third low-level feature map of the slice, to obtain a first high-level feature map of the slice as a first enhanced feature map,
perform convolution processing on a second low-level feature map of the slice; upsample the first high-level feature map of the slice; and add a feature map obtained by the convolution processing on the second low-level feature map and a feature map obtained by the upsampling of the first high-level feature map, to obtain a second high-level feature map of the slice as a second enhanced feature map, and perform convolution processing on a first low-level feature map of the slice; upsample the second high-level feature map of the slice; and add a feature map obtained by performing the convolution processing on the first low-level feature map and a feature map obtained by the upsampling of the second high-level feature map, to obtain a third high-level feature map of the slice as a third enhanced feature map.

12. The apparatus according to claim 8, wherein, when the processor is configured to cause the apparatus to respectively perform the hierarchically dilated convolutions operation on the M enhanced feature maps of the slice by the deep neural network, to generate the superposed feature map of each enhanced feature map, the processor is configured to cause the apparatus to:

for each enhanced feature map in the M enhanced feature maps:

respectively process the enhanced feature map by using K dilated convolution layers, to obtain K dilated feature maps of the enhanced feature map, K being an integer greater than 1;

process the enhanced feature map by a common convolution layer, to obtain convolution feature maps of the enhanced feature map; and obtain the superposed feature map of the enhanced feature map based on the K dilated feature maps and the convolution feature maps of the enhanced feature map.

13. The apparatus according to claim 12, wherein, when the processor is configured to cause the apparatus to obtain the superposed feature map of the enhanced feature map based on the K dilated feature maps and the convolution feature maps of the enhanced feature map, the processor is configured to cause the apparatus to:

concatenate the K dilated feature maps and the convolution feature maps of the enhanced feature map to obtain a concatenated feature map of the enhanced feature map;

obtain respective weights of the K dilated convolution layers and the common convolution layers based on the concatenated feature map of the enhanced feature map; and obtain the superposed feature map of the enhanced feature map based on the enhanced feature map, the K dilated feature maps and the convolution feature maps, and the respective weights of the K dilated convolution layers and the common convolution layers.

14. The apparatus according to claim 8, wherein, when the processor is configured to cause the apparatus to predict the position information of the region of interest and the confidence score thereof in the to-be-detected medical image by the deep neural network based on the superposed feature map of each slice in the to-be-detected medical image, the processor is configured to cause the apparatus to:

process the superposed feature map of each slice in the to-be-detected medical image, to obtain the position information of an initial region of interest and an initial confidence score thereof in the to-be-detected medical image; and process the position information of the initial region of interest and the initial confidence score thereof, to obtain the position information of the region of interest and the confidence score thereof in the to-be-detected medical image.

15. A non-transitory computer readable storage medium storing computer readable instructions, wherein, the computer readable instructions, when executed by a processor, are configured to cause the processor to perform:

acquiring a to-be-detected medical image comprising a plurality of slices;

for each slice in the to-be-detected medical image:

extracting N basic feature maps of the slice by a deep neural network, N being an integer greater than 1, merging features of the N basic feature maps of the slice by the deep neural network, to obtain M enhanced feature maps of the slice, M being an integer greater than 1, and respectively performing a hierarchically dilated convolutions operation on the M enhanced feature maps of the slice by the deep neural network, to generate a superposed feature map of each enhanced feature map of the slice; and predicting position information of a region of interest and a confidence score thereof in the to-be-detected medical image by the deep neural network based on the superposed feature map of each slice in the to-be-detected medical image.

16. The non-transitory computer readable storage medium according to claim 15, wherein:

the N basic feature maps comprise A low-level feature maps and B high-level feature maps, both A and B being integers greater than 1; and when the computer readable instructions are configured to cause the processor to perform merging the features of the N basic feature maps of the slice by the deep neural network, to obtain the M enhanced feature maps of the slice, the computer readable instructions are configured to cause the processor to perform:

performing convolution processing on an $i^{th}$ low-level feature map of the slice, upsampling a $j^{th}$ high-level feature map of the slice, and adding a feature map obtained by the convolution processing on the $i^{th}$ low-level feature map and a feature map obtained by the upsampling of the $j^{th}$ high-level feature map, to obtain a $k^{th}$ enhanced feature map of the slice, wherein $1 \leq i < A$, $1 < j \leq B$, $1 < k \leq M$, and i, j, and k are all integers.

17. The non-transitory computer readable storage medium according to claim 15, wherein:

the N basic feature maps comprise A low-level feature maps and B high-level feature maps, both A and B being integers greater than 1; and when the computer readable instructions are configured to cause the processor to perform merging features of the N basic feature maps of the slice by the deep neural network, to obtain M enhanced feature maps of the slice, the computer readable instructions are configured to cause the processor to perform:

performing convolution processing on an $A^t$ low-level feature map of the slice, to obtain a first high-level feature map of the slice as a first enhanced feature map.

18. The non-transitory computer readable storage medium according to claim 15, wherein:
the N basic feature maps comprise A low-level feature maps and B high-level feature maps;
A=3, B=3, and M=3; and
when the computer readable instructions are configured to cause the processor to perform merging the features of the N basic feature maps of the slice by the deep neural network, to obtain the M enhanced feature maps of the slice, the computer readable instructions are configured to cause the processor to perform:
performing convolution processing on a third low-level feature map of the slice, to obtain a first high-level feature map of the slice as a first enhanced feature map,
performing convolution processing on a second low-level feature map of the slice; upsampling the first high-level feature map of the slice; and adding a feature map obtained by the convolution processing on the second low-level feature map and a feature map obtained by the upsampling of the first high-level feature map, to obtain a second high-level feature map of the slice as a second enhanced feature map, and
performing convolution processing on a first low-level feature map of the slice; upsampling the second high-level feature map of the slice; and adding a feature map obtained by performing the convolution processing on the first low-level feature map and a feature map obtained by the upsampling of the second high-level feature map, to obtain a third high-level feature map of the slice as a third enhanced feature map.

19. The non-transitory computer readable storage medium according to claim 15, wherein, when the computer readable instructions are configured to cause the processor to perform respectively performing the hierarchically dilated convolutions operation on the M enhanced feature maps of the slice by the deep neural network, to generate the superposed feature map of each enhanced feature map, the computer readable instructions are configured to cause the processor to perform:
for each enhanced feature map in the M enhanced feature maps:
respectively processing the enhanced feature map by using K dilated convolution layers, to obtain K dilated feature maps of the enhanced feature map, K being an integer greater than 1;
processing the enhanced feature map by a common convolution layer, to obtain convolution feature maps of the enhanced feature map; and
obtaining the superposed feature map of the enhanced feature map based on the K dilated feature maps and the convolution feature maps of the enhanced feature map.

20. The non-transitory computer readable storage medium according to claim 19, wherein, when the computer readable instructions are configured to cause the processor to perform obtaining the superposed feature map of the enhanced feature map based on the K dilated feature maps and the convolution feature maps of the enhanced feature map, the computer readable instructions are configured to cause the processor to perform:
concatenating the K dilated feature maps and the convolution feature maps of the enhanced feature map to obtain a concatenated feature map of the enhanced feature map;
obtaining respective weights of the K dilated convolution layers and the common convolution layers based on the concatenated feature map of the enhanced feature map; and
obtaining the superposed feature map of the enhanced feature map based on the enhanced feature map, the K dilated feature maps and the convolution feature maps, and the respective weights of the K dilated convolution layers and the common convolution layers.

* * * * *